US008851129B2

(12) United States Patent
Yumii et al.

(10) Patent No.: US 8,851,129 B2
(45) Date of Patent: Oct. 7, 2014

(54) RUN-FLAT TIRE

(75) Inventors: Keita Yumii, Tachikawa (JP); Hiraki Iwasa, Kodaira (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 13/322,871

(22) PCT Filed: May 28, 2010

(86) PCT No.: PCT/JP2010/003619
§ 371 (c)(1),
(2), (4) Date: Nov. 28, 2011

(87) PCT Pub. No.: WO2010/137347
PCT Pub. Date: Dec. 2, 2010

(65) Prior Publication Data
US 2012/0067486 A1 Mar. 22, 2012

(30) Foreign Application Priority Data

May 29, 2009 (JP) .................................. 2009-131573
Feb. 24, 2010 (JP) .................................. 2010-038767

(51) Int. Cl.
B60C 17/00 (2006.01)
B60C 11/01 (2006.01)
B60C 11/117 (2006.01)
B60C 9/20 (2006.01)
B60C 11/03 (2006.01)

(52) U.S. Cl.
CPC ........... B60C 11/01 (2013.01); B60C 2011/013 (2013.04); B60C 9/20 (2013.01); B60C 11/032 (2013.04); B60C 17/0009 (2013.04); B60C 2011/0381 (2013.04); Y10S 152/03 (2013.01)

USPC ................ 152/209.16; 152/209.17; 152/517; 152/DIG. 3

(58) Field of Classification Search
CPC ....................... B60C 17/0009–17/0045; B60C 2017/0054–2017/0072; B60C 11/01; B60C 11/032; B60C 11/0323; B60C 2011/013
USPC ........... 152/517, 516, 209.17, 209.16, DIG. 3
See application file for complete search history.

(56) References Cited

U.S. PATENT DOCUMENTS 582,194 A * 5/1897 Furlong .................... 152/209.17
4,957,149 A * 9/1990 Iuchi ........................ 152/209.16
(Continued)

FOREIGN PATENT DOCUMENTS

EP 1764236 A1 3/2007
EP 1 950 060 A1 7/2008
(Continued)

OTHER PUBLICATIONS

English machine translation of JP 2006-160100 A, Jun. 22, 2006.*
(Continued)

Primary Examiner — Adrienne C Johnstone
(74) Attorney, Agent, or Firm — Sughrue Mion, PLLC

(57) ABSTRACT

Provided is a run-flat tire having a substantially-crescent-shaped cross section, which makes it possible to achieve both durability at the time of run-flat travel and ride comfort at the time of travel at a normal inner pressure. A rigidity reducing portion that reduces a tire rigidity in the width direction extends in the circumferential direction on a surface of a tread rubber in an area located on the inner side than an end of a belt in the tire width direction and on the outer side than a road-contacting end in the tire width direction under a 75% load state.

4 Claims, 10 Drawing Sheets

(56) References Cited

U.S. PATENT DOCUMENTS

| | | | |
|---|---|---|---|
| 6,439,283 B1 * | 8/2002 | Paonessa et al. | 152/517 X |
| 2007/0056664 A1 * | 3/2007 | Suzuki | 152/209.16 |
| 2010/0200137 A1 * | 8/2010 | Narita | |

FOREIGN PATENT DOCUMENTS

| | | | | |
|---|---|---|---|---|
| JP | 58-139806 | A | | 8/1983 |
| JP | 8-034214 | A | | 2/1996 |
| JP | 2004074914 | A | | 3/2004 |
| JP | 2004-182036 | A | | 7/2004 |
| JP | 2005028954 | A | | 2/2005 |
| JP | 2006-076401 | A | | 3/2006 |
| JP | 2006160100 | A | * | 6/2006 |
| JP | 2007-050738 | A | | 3/2007 |
| JP | 2007091167 | A | | 4/2007 |
| JP | 2007-296878 | A | | 11/2007 |
| JP | 4104825 | A | | 6/2008 |
| WO | WO-2009/040439 | A1 | * | 4/2009 |

OTHER PUBLICATIONS

Mechanics of Pneumatic Tires, ed. Samuel Clark, US Department of Transportation, Aug. 1981, pp. 219-220.*
English machine translation of JP 8-34214 A, Feb. 6, 1996.*
International Search Report, PCT/JP2010/003619, dated Jul. 20, 2010.
Korean Office Action dated May 21, 2013 issued in KR Patent Application No. 10-2011-7031271.
Japanese Office Action dated Apr. 16, 2013 issued in JP Patent Application No. 2009-131537.
Extended European Search Report, dated Mar. 27, 2013, issued in European Application No. 10780307.4.
European Office Action dated Dec. 10, 2013 issued in European Patent Application No. 10780307.4.
Japanese Office Action issued in JP Patent Application No. 2010-038767 dated Aug. 27, 2013.
Chinese Office Action dated Aug. 5, 2014, issued in Chinese Patent Application No. 201080029158.1.

* cited by examiner (a)

(b)

Cross section A-A

Cross section B-B (c)

Cross section C-C (a)

Cross section A-A (b)

Cross section B-B

RUN-FLAT TIRE

CROSS REFERENCE TOP RELATED APPLICATIONS

This application is a National Stage of International Application No. PCT/JP2010/003619 filed May 28, 2010, claiming priorities based on Japanese Patent Application Nos. 2009-131573, filed on May 29, 2009 and 2010-038767 filed Feb. 24, 2010, the contents of all of which are incorporated herein by reference in their entirety.

TECHNICAL FIELD

The present invention relates to a run-flat radial tire in which a reinforcing rubber layer having a substantially-crescent-shaped cross section is disposed on an interior circumference side of a radial carcass at at least a portion corresponding to a side wall portion, and in particular, to a run-flat radial tire capable of achieving both durability at the time of run-flat travel and comfortable ride during travel at a normal inner pressure.

RELATED ART

Conventionally, as illustrated in a sectional view of FIG. 1, there is known a run-flat radial tire 90 including: a tread rubber 1 disposed on a tread portion 11 and forming a road-contacting surface; a radial carcass 3 formed by one or more carcass plies, side portion of which carcass plies are turned-up outwards in the radial direction around a pair of bead cores 2 disposed to each bead portion 12; a belt 4 formed by one or more sheets of belt plies disposed between the radial carcass 3 and the tread rubber 1; and a reinforcing rubber layer 5 having a substantially-crescent-shaped cross section and disposed on the inner side of the radial carcass 3 in the tire width direction at at least a portion corresponding to a side wall portion 13 (see, for example, Patent Document 1).

The run-flat radial tire 90 as described above is configured so as to maintain a shape of the tire with the help of the reinforcing rubber layer 5 disposed to the side wall portion 13 even in a state where a pneumatic pressure in the tire lowers or becomes zero, in other words, in a run-flat state, so that it is possible to travel with a sufficient durability.

RELATED ART DOCUMENT

Patent Document

Patent Document 1: Japanese Patent No. 4104825

DISCLOSURE OF THE INVENTION

Problems to be Solved by the Invention

The reinforcing rubber layer 5 is required to have the functions described above, and hence, a rubber material having a high rigidity has been employed, the thickness of the layer has been thickened, or a fiber reinforced layer has been added. This leads to an increase in the spring constant at the time of traveling at a normal inner pressure, resulting in a less comfortable ride.

The present invention has been made in view of the problems described above, and an object of the present invention is to provide a run-flat radial tire provided with a reinforcing rubber layer having a substantially-crescent-shaped cross section and capable of achieving both durability at the time of run-flat traveling and comfortable ride during travel at a normal inner pressure.

Means for Solving the Problem

A first aspect of the present invention provides a run-flat radial tire having: a tread portion; a pair of side wall portions extending internally in the radial direction from both end portions of the tread portion; a bead portion extending continuously to the inner side of each of the side wall portions; a tread rubber provided to the tread portion and forming a road contacting surface; a radial carcass formed by one or more carcass plies, side portions of which carcass plies are turned-up outwards in the radial direction around a pair of bead cores disposed to each of the bead portions; a belt formed by one or more belt ply disposed between the radial carcass and the tread rubber; and, a reinforcing rubber layer having a substantially-crescent-shaped cross section and disposed on the inner side in the tire width direction of the radial carcass at at least a portion corresponding to each of the side wall portions, in which the tread portion has a rigidity reducing portion that reduces the rigidity of the tire, the rigidity reducing portion being formed in an area of the tread portion located on the inner side than an end of the belt in the tire width direction and on the outer side than a road-contacting end in the tire width direction at a 75% load.

A second aspect of the present invention provides the run-flat tire according to the first aspect, in which an inner end of the reinforcing rubber layer in the tire width direction is positioned on the outer side in the tire width direction than the road-contacting end under the 75% load state and on the inner side than the belt end.

A third aspect of the present invention provides the run-flat tire according to the first or second aspect, in which the belt includes an intersecting belt layer formed by attaching two belt plies to each other with their respective cords being inclined at an angle opposite to each other with respect to an equatorial plane; of the belt plies constituting the intersecting belt layer, an end of a narrower-width ply is located on the outer side in the tire width direction than the road-contacting end under the 75% load state; and the rigidity reducing portion is located on the inner side in the tire width direction than the end of the narrower-width ply (hereinafter, also referred to as "narrower-width side ply end").

A fourth aspect of the present invention provides the run-flat tire according to any one of the first to the third aspects, in which the rigidity reducing portion is configured by a circumferential groove that opens to a surface of the tread rubber.

A fifth aspect of the present invention provides the run-flat tire according to the fourth aspect, in which the circumferential groove is formed in an intermittent manner so as not to cross an other groove that opens to the surface of the tread rubber.

A sixth aspect of the present invention provides the run-flat tire according to any one of the first to the third aspects, in which the rigidity reducing portion is configured such that a large number of holes opening to a surface of the tread rubber and elongated in the circumferential direction are arranged in the circumferential direction.

A seventh aspect of the present invention provides the run-flat tire according to any one of the first to the sixth aspects, in which the rigidity reducing portion is formed in a manner that at least a part of a recessed portion of the rigidity reducing portion along the tire circumferential direction is provided in an area of the tread portion defined by a tread line of the tread portion passing through the end of the belt and crossed by a plane perpendicular to a surface of the tire, and a road-contacting end line of the tread under the 75% load state; and, of side walls forming the recessed portion, a side wall located on the outer side in the tire width direction has an obtuse angle with respect to the surface of the tire when the recessed portion is viewed in the cross section in the tire width direction.

An eighth aspect of the present invention provides the run-flat tire according to the seventh aspect, in which the obtuse angle is 95° or more.

Effect of the Invention

The present inventors divided the tire into finite elements, and calculated stresses acting on each of the elements under a normal inner pressure state (equal to the "75% load state" described above) where a 75% load relative to the predetermined load is applied at a normal inner pressure to simulate a travel at a normal inner pressure and under a zero inner pressure state where the 75% load relative to the predetermined load is applied at a zero inner pressure to simulate a run-flat travel, thereby obtaining an area where stresses occurring under the normal inner pressure state is higher than those occurring under the zero inner pressure state. As a result, the present inventors found that this area corresponds to an area extending in the tire width direction from the vicinity of the road-contacting end to the belt end in the road-contacting area at the time of travel at the normal inner pressure.

According to the first aspect, the rigidity reducing portion that reduces the rigidity in the width direction extends in the circumferential direction on a surface of the tread rubber in the area located on the inner side in the tire width direction than the end of the belt and on the outer side in the tire width direction than the road-contacting end under the 75% load state. Therefore, on the basis of the findings made by the present inventors, it is possible to effectively reduce the rigidity at the time of travelling at the normal inner pressure to improve the comfort ride, without largely sacrificing the effect on the durability at the time of run-flat travel.

Further, since the rigidity reducing portion such as the circumferential groove is disposed on the outer side in the tire width direction of the road-contacting end under the 75% load state, it is possible to prevent the occurrence of partial wear called a drag wear, which is likely to occur generally at the end portion in the road-contacting area.

According to the second aspect, since the inner end of the reinforcing rubber layer in the tire width direction is positioned on the outer side in the tire width direction than the road-contacting end under the 75% load state and on the inner side than the end of the belt, it is possible to reduce the rigidity in the vicinity of the road-contacting end.

According to the third aspect, since, of belt plies forming the intersecting belt layer, the end of the narrower-width ply is located on the inner side in the tire width direction as described in detail later, it is possible to further effectively reduce the rigidity at the time of travel at the normal inner pressure.

According to the fourth aspect, since the rigidity reducing portion is configured by the circumferential groove that opens to the surface of the tread rubber, it is possible to realize the reduction in rigidity in an extremely effective, easy manner.

According to the fifth aspect, since the circumferential groove is formed intermittently so as not to cross an other groove that opens to the surface of the tread rubber, it is possible to prevent the partial wear occurring in the case where these grooves cross each other.

According to the sixth aspect, the rigidity reducing portion is formed such that a large number of holes elongated in the circumferential direction and opening to the surface of the tread rubber disposed in the circumferential direction are arranged in the circumferential direction. Therefore, in this case, it is also possible to realize the reduction in rigidity in an extremely effective, easy manner According to the seventh aspect, since the recessed portion is provided in the predetermined area of the tread portion, it is possible to improve the comfort ride at the time of travel at the normal inner pressure while maintaining the durability at the time of run-flat travel. Further, since, of the side walls forming the recessed portion, the side wall located on the outer side in the tire width direction has the obtuse angle with respect to the surface of the tire when the recessed portion is viewed in the cross section in the tire width direction, it is possible to prevent the occurrence of the curling-up-type wear at the time of high-speed cornering According to the eighth aspect, since the angle of the side wall located on the outer side in the tire width direction with respect to the surface of the tire is set to 95° or more it is possible to obtain the further higher effect of reducing the curling-up-type wear.

BEST MODE FOR CARRYING OCT THE INVENTION

Figure 1:
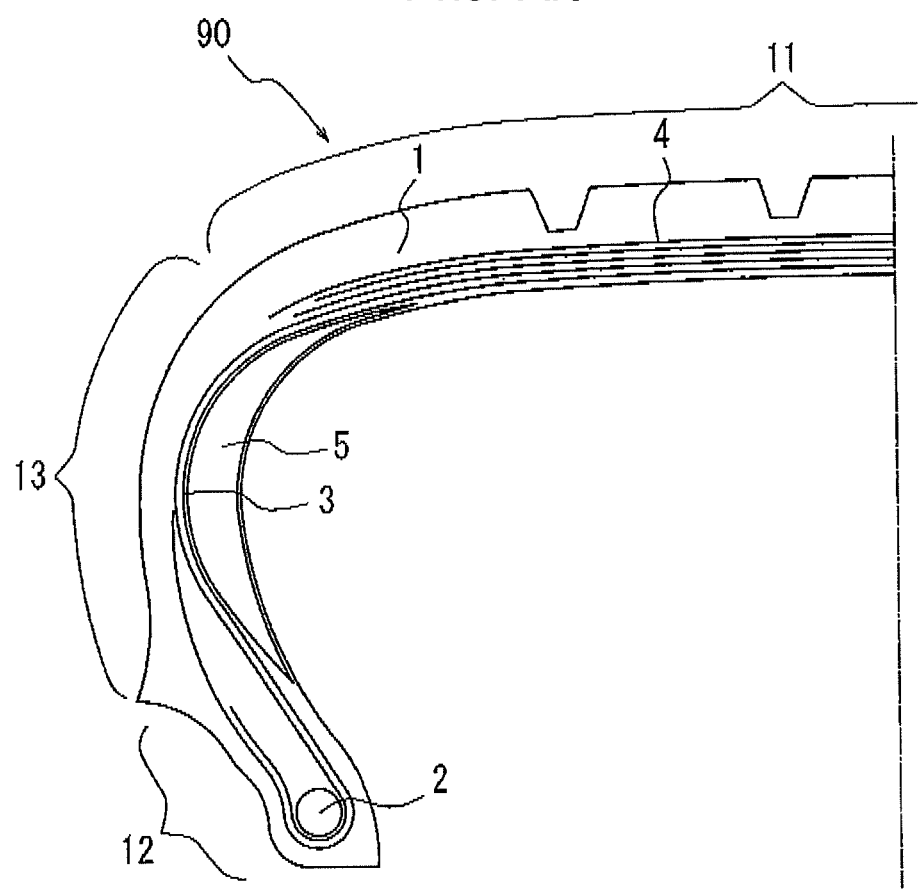
FIG. 1 is a sectional view illustrating a conventional run-flat tire.
Figure 2:
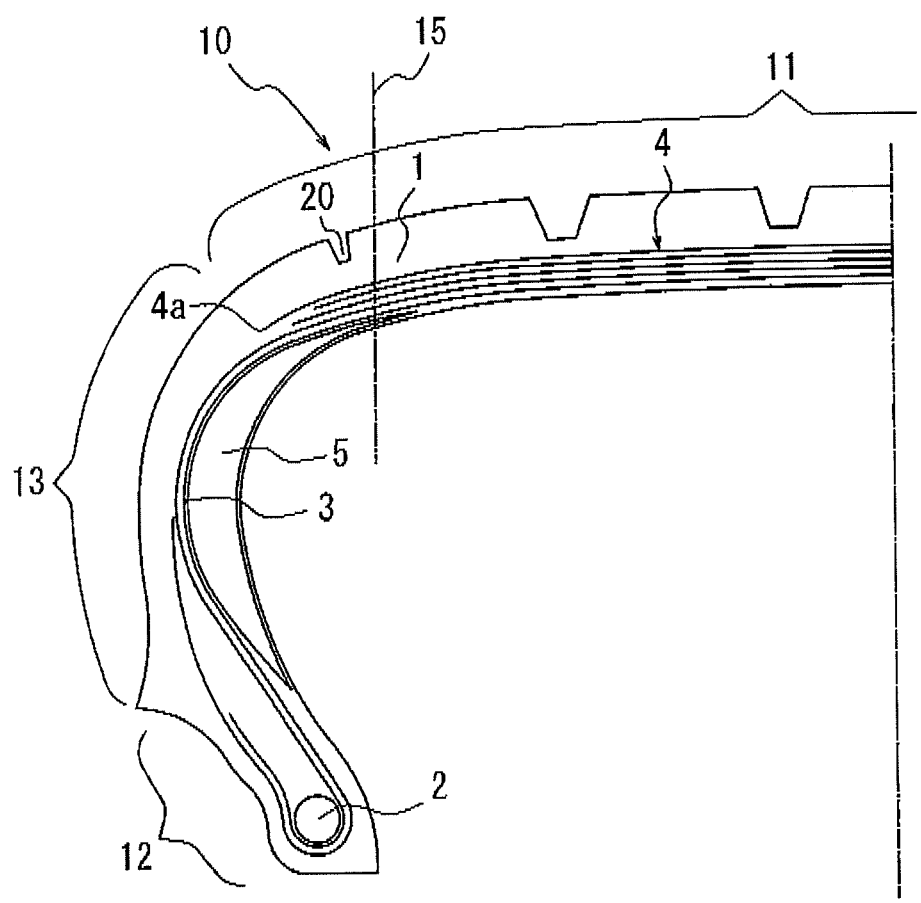
FIG. 2 is a sectional view illustrating a run-flat tire according to this embodiment of the present invention.
Figure 3:
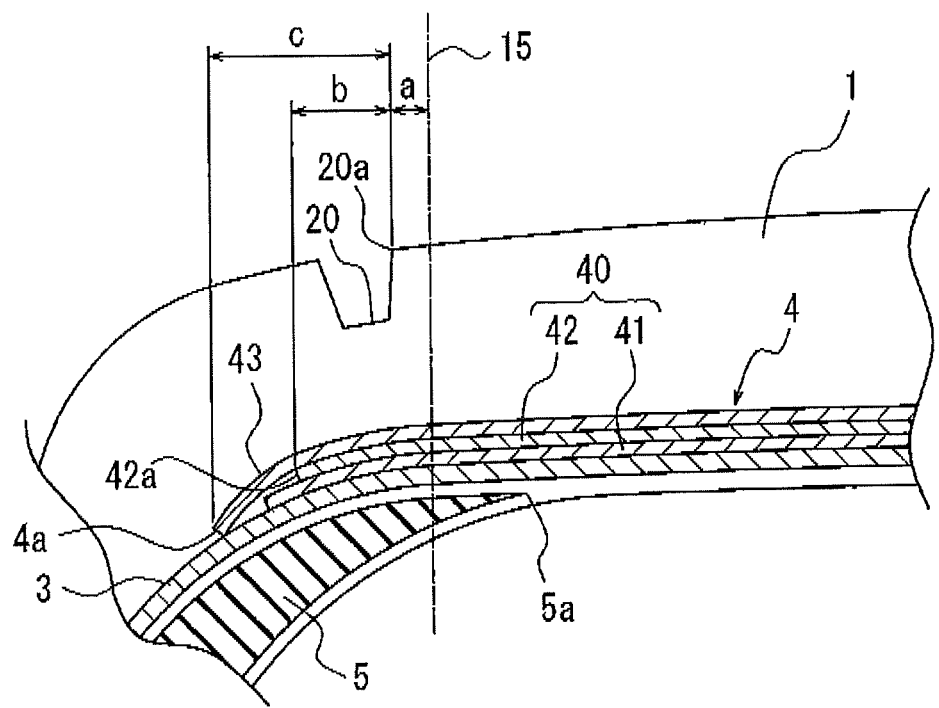
FIG. 3 is an enlarged sectional view schematically illustrating a detail of the tire in the vicinity of a belt end portion in FIG. 2.

An embodiment of the present invention will be described with reference to the drawings. FIG. 2 is a sectional view illustrating a run-flat tire according to this embodiment, and FIG. 3 is a sectional view in which a portion in the vicinity of an end of a belt of the run-flat radial tire is enlarged. A run-flat radial tire 10 includes: a tread rubber 1 disposed to a tread portion 11 and forming a road-contacting surface; a radial carcass 3 formed by one or more carcass plies, side portions of which carcass plies are turned-up outwards in the radial direction around a pair of bead cores 2 disposed to each bead portion 12; a belt 4 formed by one or more belt plies disposed between the radial carcass 3 and the tread rubber 1; and, a reinforcing rubber layer 5 having a substantially-crescent-shaped cross section and disposed on the inner side of the radial carcass 3 in the tire width direction at at least a portion corresponding to side wall portion 13.

As can be understood from FIG. 3, in the run-flat radial tire 10, an inner end 5a of the reinforcing rubber layer 5 in the tire width direction is disposed on the inner side in the tire width direction than a road-contacting end 15 in the tire width direction of the tire under a 75%-load state where the tire is assembled with a predetermined rim, inflated at a predetermined inner pressure, and subjected to a 75% load relative to a predetermined load. Further, an outer end 4a (belt end) of the belt in the tire width direction is disposed on the outer side in the tire width direction than the road-contacting end 15 under the 75%-load state.

It should be noted that the predetermined load represents a maximum load (maximum load capacity) per wheel with an applicable size specified under a predetermined industrial standard; the predetermined inner pressure represents a pneumatic pressure corresponding to the maximum load (maximum load capacity) per wheel with the applicable size specified under the above-described industrial standard; and the predetermined rim represents a standard rim (or "approved rim," "recommended rim") with the applicable size specified under this predetermined industrial standard. The industrial standard described above is an industrial standard effective in a region where the tire is manufactured or used, and is specified, for example, in "The Tire and Rim Association Inc. Year Book" (including a design guide) in the United States, "The European Tyre and Rim Technical Organisation Standards Manual" in Europe, and "JATMA YEAR BOOK" by the Japan Automobile Tyre Manufacturers Association in Japan.

The run-flat radial tire 10 according to the present invention has the general structure as described above, and is characterized in that a rigidity reducing portion 20 that reduces the tire rigidity in the width direction extends circumferentially on the surface of the tread rubber 1 and in the area of the tread rubber 1 located on the inner side than the belt end 4a in the tire width direction and on the outer side than the road-contacting end 15 in the tire width direction under the 75% load state. In this specification, a position of the rigidity reducing portion 20 in the tire width direction refers to a position of an inner end 20a of the rigidity reducing portion 20 in the tire width direction. More specifically, in FIG. 3, the inner end 20a in the tire width direction is located on the outer side than the road-contacting end 15 under the 75% load state in the tire width direction by a dimension of a, and is located on the inner side than the belt end 4a in the tire width direction by a dimension of c.

Figure 4:
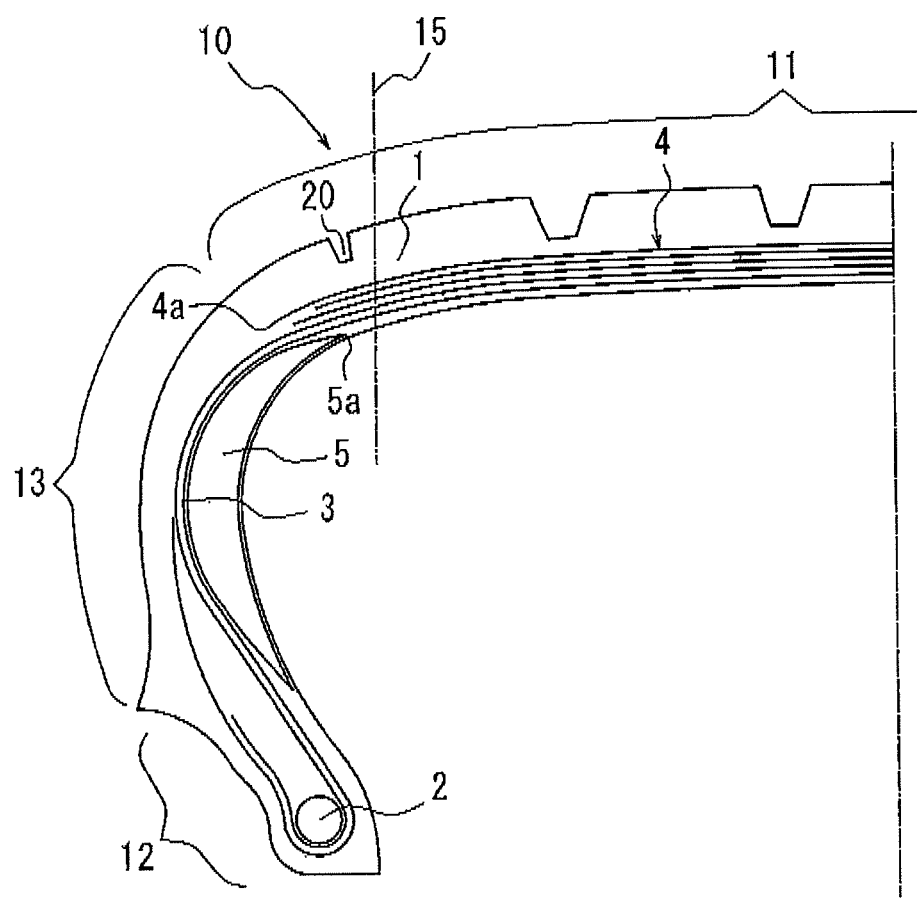
FIG. 4 is a sectional view illustrating a modification example of a run-flat tire according to this embodiment of the present invention.

It should be noted that, as illustrated in FIG. 4, which is a sectional view illustrating a modification example of this embodiment in a manner that corresponds to FIG. 2, the rigidity in the vicinity of the road-contacting end can be further reduced by disposing the inner end 5a of the reinforcing rubber layer 5 in the tire width direction on the outer side than the road-contacting end 15 in the tire width direction under the 75% load state. It should also he noted that the inner end 20a of the rigidity reducing portion 20 in the tire width direction on the surface of the tread rubber 1 is positioned on the inner side in the tire width direction than the inner end 5a of the reinforcing rubber layer 5 in the tire width direction and on the outer side in the tire width direction than the road-contacting end 15 under the 75% load state.

Figure 5:
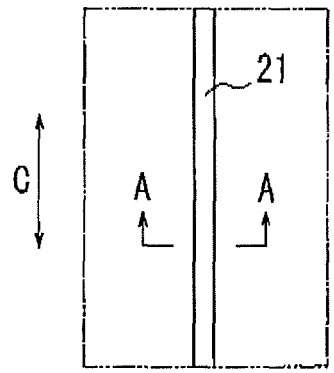
FIG. 5 are schematic views illustrating examples of shapes of a rigidity reducing portion according to the embodiment of the present invention.
Figure 5:
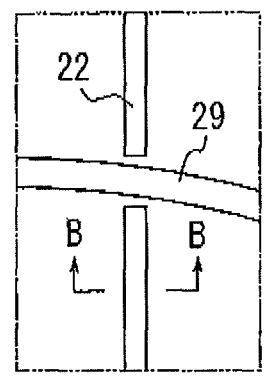
Figure 5:
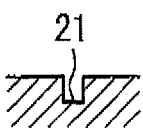
Figure 5:
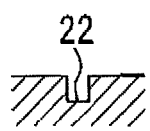
Figure 5:
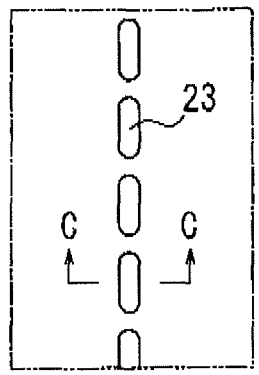
Figure 5:
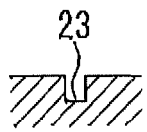
Figure 6:
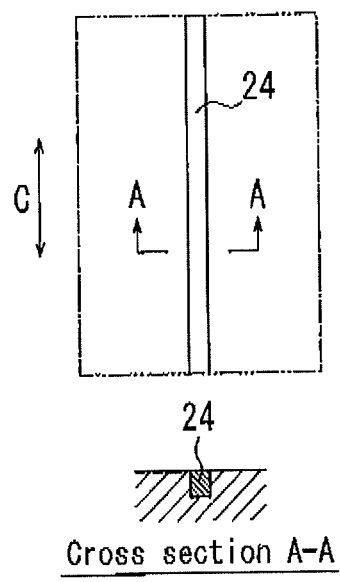
FIG. 6 are schematic views illustrating examples of the other shapes of the rigidity reducing portion according to the embodiment of the present invention.
Figure 6:
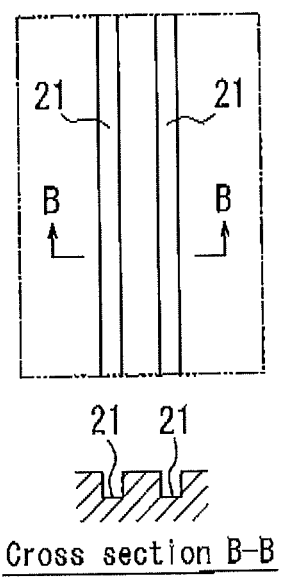

FIGS. 5(a) to 5(c) and FIGS. 6(a) and 6(b) illustrate examples of modes of the rigidity reducing portion 20. More specifically, the rigidity reducing portion 20 may be formed: into a circumferential groove 21 that continuously extends in the circumferential direction as illustrated in FIG. 5(a); into a circumferential groove 22 separated by an other groove 29 so as not to cross the other groove 29 as illustrated in FIG. 5(b); or, in a formation in which openings 23 each having a shape elongated in the circumferential direction are arranged in the circumferential direction as illustrated in FIG. 5(c). Alternatively, rather than the groove or the openings, the rigidity reducing portion 20 may be formed into a reduced-rigidity rubber circumferential band 24 extending in the circumferential direction and formed, for example, by a rubber having smaller rigidity as compared with the other portion of the tread rubber as illustrated in FIG. 6(a), or be formed such that two or more examples described above are arranged in the tire width direction. FIG. 6(b) illustrates an example in which two circumferential grooves 21 are arranged.

Figure 11:
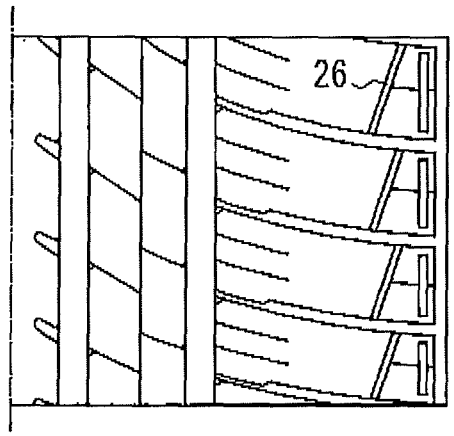
FIG. 11 is a tread pattern view illustrating the rigidity reducing portion of yet another example.
Figure 12:
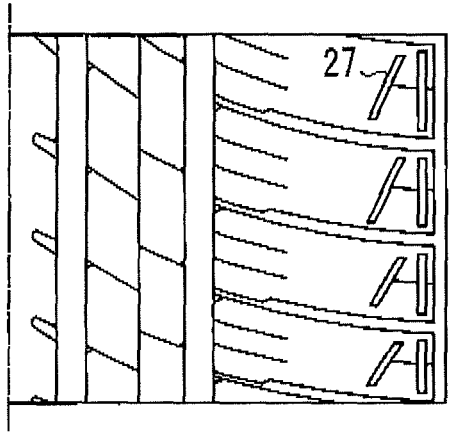
FIG. 12 is a tread pattern view illustrating the rigidity reducing portion of yet another example.
Figure 13:
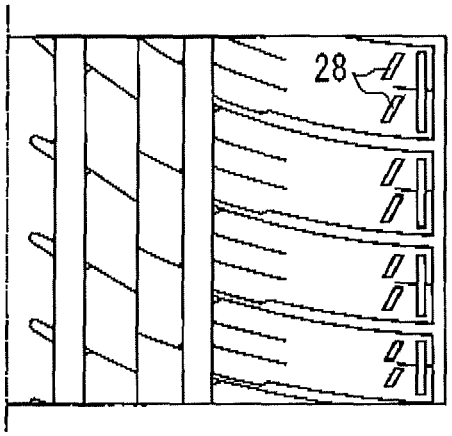
FIG. 13 is a tread pattern view illustrating the rigidity reducing portion of yet another example.

Instead of the circumferential groove, it may be possible to employ an inclined groove. FIGS. 11 and 12 illustrate patterns of one side of the tire tread as examples of the inclined groove. In FIGS. 11 and 12, the reference numbers 26 to 28 represent the inclined grooves.

The present inventors reached the configuration described above in the following manner. As described above, the present inventors divided the tire into finite elements, and compared stresses acting on each of the elements between under a normal inner pressure state where a 75% load relative to the predetermined load is applied at a normal inner pressure to simulate a travel at a normal inner pressure and under a zero inner pressure state where the 75% load relative to the predetermined load is applied at a zero inner pressure to simulate a run-flat travel. As a result, the present inventors found that, in an area extending in the tire width direction from the vicinity of the road-contacting end of the road-contacting area at the time of traveling at the normal inner pressure to the belt end, stresses acting on the elements were higher under the normal inner pressure state as compared with those under the zero inner pressure state. On the basis of the above-described findings, the present inventors considered that this area has excessively large effect on supporting the load under the normal traveling state although it has little effect on supporting the load under the zero inner pressure state, and hence, by reducing the rigidity in this area, the effect on the durability under the zero inner pressure state can be minimized, and at the same time, the spring constant under the normal inner pressure state can be reduced.

Figure 7:
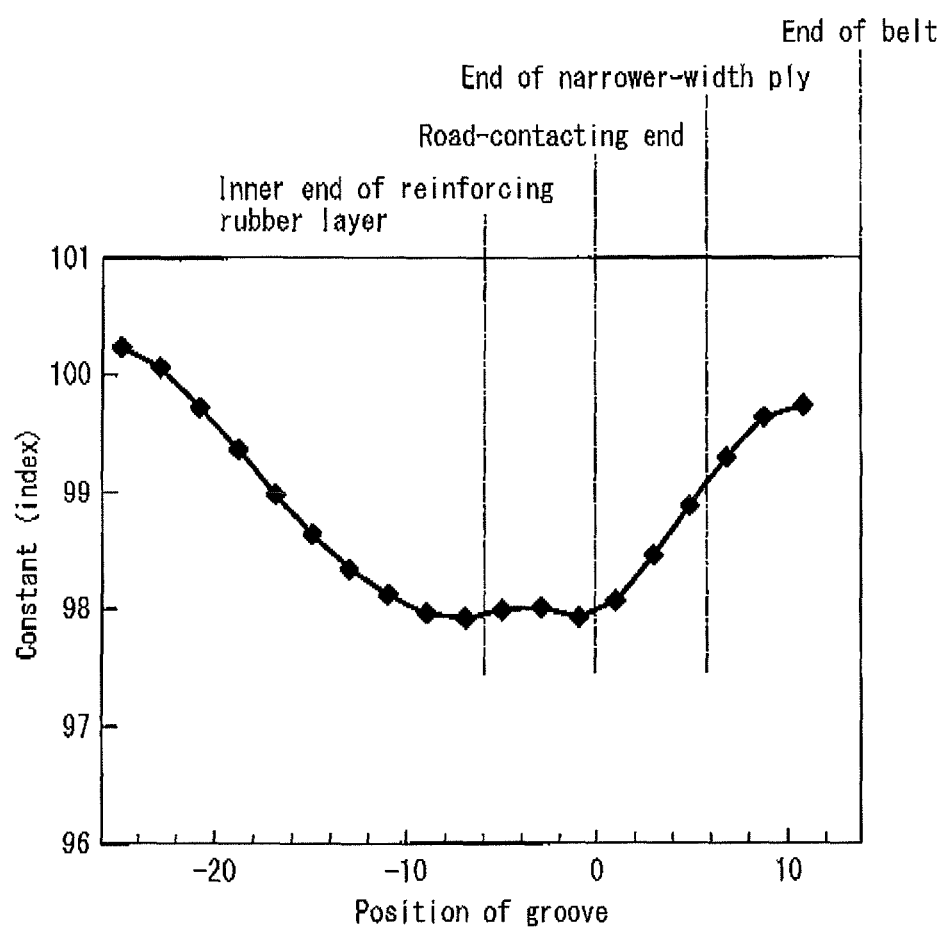
FIG. 7 is a graph illustrating a relationship between positions in the circumferential groove and the spring constant.

FIG. 7 is a graph indicating how spring constants obtained through a finite element method change according to positions of a circumferential groove in the tire width direction, the circumferential groove being formed in an area including the above-described area so as to have a width of 2 mm and a depth of 4 mm and continue in the circumferential direction. A horizontal axis represents positions in the tire width direction on the basis of the road-contacting end 15 ("road-contacting end") under the 75% load state in 2-mm increments. A vertical axis represents indices of spring constants at the time of varying the width positions of the inner end 20a of the circumferential groove 21 in the tire width direction, with the spring constant of the entire tire having no circumferential groove 21 provided being set to 100.

Calculation of the spring constants described above was made such that a tire with a size of 245/45R19 was assembled with a predetermined rim and was inflated at a predetermined inner pressure; then, the tire was subjected to a 75% load of the predetermined load, and deformation occurring at that time was calculated. The predetermined inner pressure corresponding to this tire is 230 kPa, and the 75% load of the predetermined load is 5.145 kN.

As can be clearly understood from FIG. 7, a reduction rate of the spring constant is high on the inner side of the road-contacting end 15 and in the vicinity of the road-contacting end, and the reduction rate decreases toward zero with distance from the road-contacting end 15 in the tire width direction. The reduction effect continues to the belt end 4*a*. However, the circumferential groove 21 needs to be disposed to the outside of the road-contacting surface, because, if the circumferential groove 21 enters the road-contacting area, there is a possibility that drag wear or step wear caused by the stepwise difference in rigidity occurs.

As can be understood from the example of the rigidity reducing portion 20 configured by the circumferential groove 21 as described above, the run-flat tire 10 according to the present invention has the rigidity reducing portion 20 arranged on the surface of the tread rubber in the area located on the inner side than the belt end 4*a* in the tire width direction and on the outer side than the road-contacting end 15 under the 75% load state in the tire width direction. As can be clearly understood from FIG. 7, it is preferable that: the belt 4 includes an intersecting belt layer 40 formed by attaching two belt plies 41 and 42 to each other with their cords being inclined at angles opposite to each other with respect to the equatorial plane, as is the case with general belts; and, the rigidity reducing portion 20 is disposed on the inner side in the tire width direction than a ply end 42*a* of the narrower-width ply 42 among the belt plies 41 and 42 constituting the intersecting belt layer 40, in the case where the end 42*a* of the narrower-width ply 42 is disposed on the outer side in the tire width direction than the road-contacting end 15 under the 75% load state. It should be noted that the belt 4 described in this embodiment has a belt reinforcing layer 43 disposed on the outer side of the intersecting belt layer 40 in the radial direction. In this embodiment, since the outer end of the belt reinforcing layer 43 is located on the outer side than the outer end of the intersecting belt layer 40 in the tire width direction, the belt end 4*a* is the outer end of the belt reinforcing layer 43.

Figure 14:
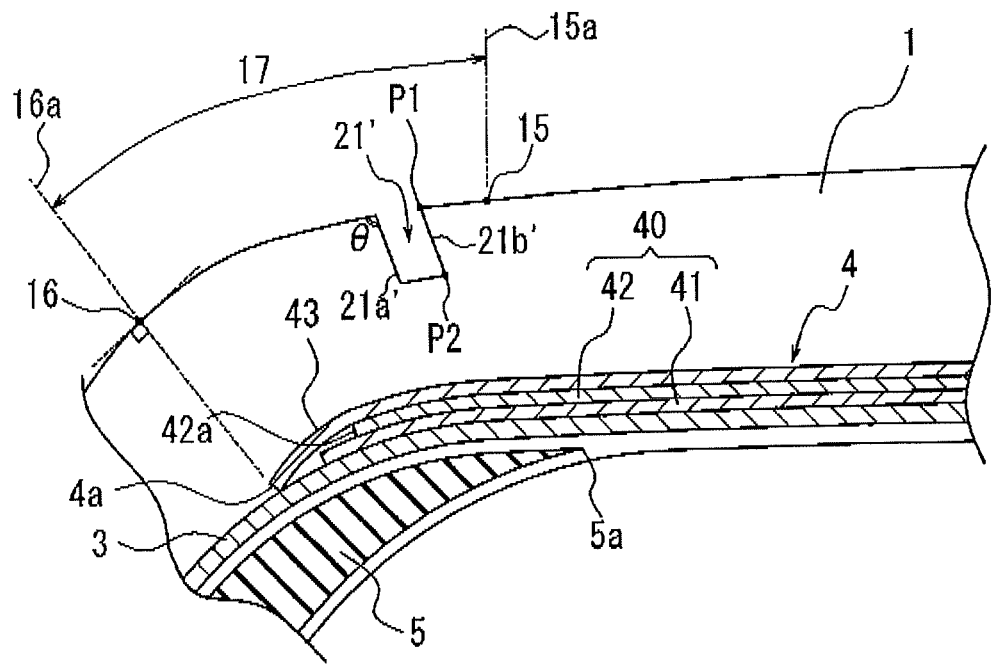
FIG. 14 is an enlarged sectional view illustrating the other run-flat tire of yet another example.

Next, the run-flat tire 10 of another embodiment of the present invention will be described with reference to FIG. 14. The reference numeral 15 represents a road-contacting end line of the tread of the run-flat tire 10 assembled with a predetermined rim and subjected to the 75% load, and the reference numeral 15*a* represents a plane passing through the road-contacting end line 15 of the tread and drawn perpendicular to the tire surface.

A reference numeral 16 represents a tread surface line of the tread portion passing through an end edge 4*a* of the belt 4 and being crossed by a plane 16*a* perpendicular to the tire surface. Next, the significance of the end edge 4*a* of the belt will be described. The belt 4 includes the intersecting belt layer 40 formed, typically, by attaching two belt plies 41 and 42 to each other with their cords being inclined at angles opposite to each other with respect to the equatorial plane. Further, the belt 4 described in this embodiment has a first belt reinforcing layer 43 (also referred to as cap layer) disposed on the outer side of the intersecting belt layer 40 in the tire radial direction and having cords arranged substantially in parallel to the tire equatorial plane. The outer end of the first belt reinforcing layer 43 is located on the outer side than the outer end of the intersecting belt layer 40 in the tire width direction. In this case, the belt end 4*a* is the outer end of the belt reinforcing layer 43. As described above, of the layers constituting the belt 4, the outer end of a layer located on the outermost side in the tire width direction is the belt end 4*a*. The same applies to a so-called cap-and-layer structure having a narrower-width second belt reinforcing layer (layer) disposed so as to cover both end portions of the first belt reinforcing layer 43.

It should be noted that the expression "the plane 15*a*, 16*a* being 'perpendicular to the tire surface'" means, in the strict sense, being perpendicular to a tangent line on the tire surface. Hereinafter, the reference numeral 15 is also referred to as a "road-contacting end line of the tread at the time of normal travel," and the reference numeral 16 is also referred to as a "tread line of the tread portion at the belt end edge." The tread line 16 of the tread portion at the belt end edge is located on the outer side in the tire width direction than the road-contacting end line 15 of the tread at the time of normal travel. Further, the inner end 5*a* of the reinforcing rubber layer 5 in the tire width direction is located on the inner side in the tire width direction than the road-contacting end line 15 of the tread at the time of normal travel.

As a characteristic configuration of this embodiment, the run-flat tire 10 has a recessed portion 21' as the rigidity reducing portion extending along the circumferential direction and located in an area 17 of the tread portion defined by the road-contacting end line 15 of the tread at the time of normal travel and the tread line 16 of the tread portion at the belt end edge. With the recessed portion 21', the rigidity in this area 17 reduces.

As an additional characteristic configuration of the run-flat tire 10, of side walls 21*a'* and 21*b'* forming the recessed portion 21', the side wall 21*a'* located on the outer side in the tire width direction has an obtuse angle θ with respect to the tire surface when the recessed portion 21' is viewed in the cross section of the tire width direction. In this specification, the expression "angle θ of the side wall 21*a'* with respect to the tire surface" means an angle of a tangent line on the tire surface at an opening end of the recessed portion 21' with respect to a tangent line on the recessed wall 21*a'* at the opening end thereof. More specifically, the angle θ of the side wall 21*a'* can be conceptualized even when the side wall 21*a'* is formed in a curved shape. The area 17 is an area not brought into contact with the road surface at the time of normal travel, but is an area possibly temporarily brought into contact with the road surface at the time of high-speed cornering. At the time of the high-speed cornering, the tire receives a side force input from the outer side to the inner side in the tire width direction. In this respect, the side wall 21*a'* located on the outer side in the tire width direction has the obtuse angle with respect to the tire surface to enhance the durability against the side force, whereby a curling-up-type wear is less likely to occur on the recessed portion 21'. As described above, the present invention has technical characteristics in that the recessed portion 21' inclined on the tire equatorial side with respect to the line normal to the surface of the tire is provided to the area 17, and can be made only after recognizing the above-described problem occurring in the case of high-speed cornering with the run-flat tire 10 having the recessed portion 21' in the area 17. Note that the reference character 21*b'* represents a side wall located on the inner side in the tire width direction.

It should be noted that, in the present invention, it is only necessary that at least a part of the recessed portion 21' is located in the area 17. For example, although not shown, the present invention includes a case where an inner end P1 of the recessed portion 21' of the tread surface in the tire width direction is included in the area 17, even if an innermost position P2 in the width direction of the bottom wall of the recessed portion is not located in the area 17.

Incidentally, it is preferable that the recessed portion 21' is a circumferential groove extending continuously along the circumferential direction as in the above-described embodiment. This is because this is the most effective form to reduce the longitudinal spring constant, which has the most effect on the comfortable ride.

It is preferable that, of the side walls forming the recessed portion, the side wall portion 21a' located on the outer side in the tire width direction has the angle θ of 95° or more with respect to the tire surface when the recessed portion 21' is viewed in the cross section of the tire width direction. This is because, by setting the angle θ to 95° or more, further higher effect of reducing the curling-up-type wear can be expected.

Although not shown, it is preferable that the recessed portion has a shape in which the opening portion thereof is wider than the groove bottom portion. Further, it is preferable that, of the side walls forming the recessed portion, the side wall portion located on the outer side in the tire width direction extends toward the inside of the tire and is bent so as to approach the tire equatorial plane when the recessed portion 21' is viewed in the cross section of the tire width direction. This is because, with this configuration, troubles concerning the manufacturing thereof (trouble at the time of being taken out from mold) are less likely to occur, and effects on maneuverability at the time of normal use can be reduced. Note that the present invention includes a case where an edge of the opening on the outer side of the recessed portion in the tire width direction is formed into a round shape, provided that the angle of the extension line of the tire surface with respect to the extension line of the side wall is an obtuse angle.

EXAMPLE

Spring constants of the tire with a size of 245/45R19 were measured under the normal inner pressure state and the zero inner pressure state with various groove positions in the tire width direction, various cross-sectional shapes, and various shapes in the circumferential direction (continuity, length in the case of discontinuous shape, pitches and the like), results of which are shown in Table 1.

As described above, in this specification, the normal inner pressure state refers to a state where the tire is assembled with the predetermined rim, inflated at the predetermined inner pressure, and subjected to the 75% load of the predetermined load, and the zero inner pressure state refers to a state where the tire is assembled with the predetermined rim, and is subjected to the 75% load of the predetermined load with the zero inner pressure. Therefore, it can be considered that the spring constants under the normal inner pressure state are parameters for simulating spring constants at the time of traveling at the normal inner pressure, whereas the spring constants under the zero inner pressure state are parameters representing the durability at the time of run-flat travel. The spring constants were measured such that a load was applied in a direction passing through a central axis of the tire located in a surface perpendicularly intersecting the axial direction of the tire, and deformation in the direction of the applied load was measured. The results are indicated as indices obtained by setting the spring constant of the tire of Comparative Example 1, which is a tire without grooves as the rigidity reducing portion, to 100. The smaller index represents the smaller spring constants.

In Table 1, the wording "position in tire width direction (mm)" refers to a separation distance of an inner end of the circumferential groove in the tire width direction from the road-contacting end E under the 75% load state. It should be noted that a ply end on the narrower-width side of the intersecting belt layer 40 is separated from the road-contacting end E by 6 mm toward the outer side in the tire width direction, and the belt end is separated from the road-contacting end E by 14 mm toward the outer side in the tire width direction.

Figure 8:
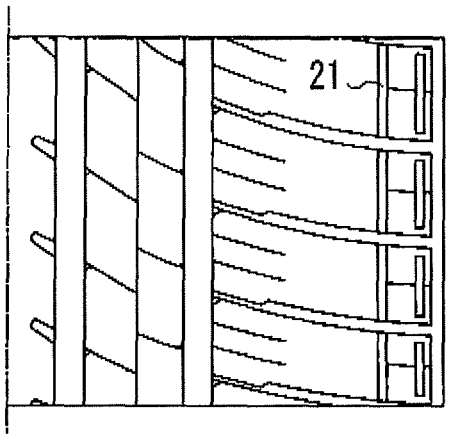
FIG. 8 is a tread pattern view illustrating the rigidity reducing portion according to the embodiment of the present invention.
Figure 9:
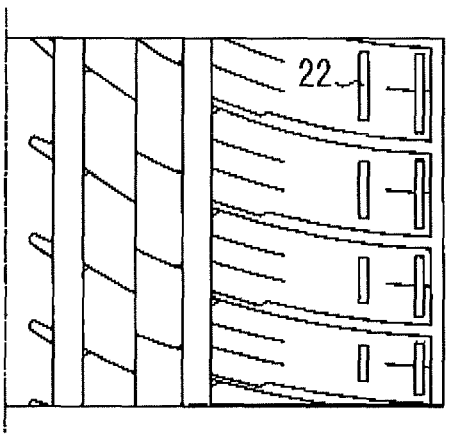
FIG. 9 is a tread pattern view illustrating the rigidity reducing portion of another example.
Figure 10:
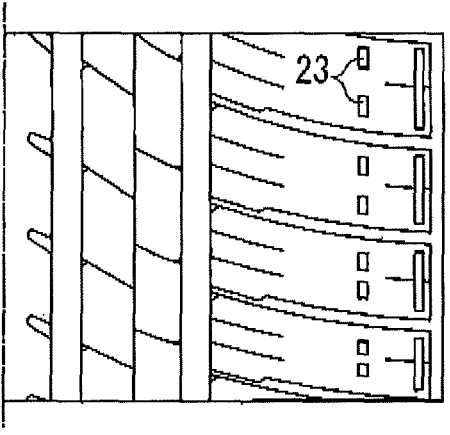
FIG. 10 is a tread pattern view illustrating the rigidity reducing portion of yet another example.

Further, in the column of "cross-sectional shape of circumferential groove" in Table 1, a character "A" denotes a cross-sectional shape with a depth of 4 mm and a width of 2 mm, and a character "B" denotes a cross-sectional shape with a depth of 2 mm and a width of 4 mm. In the column of "circumferential shape of circumferential groove," a character "K" denotes a circumferential groove 21 provided on the tread pattern illustrated in FIG. 8 and formed so as to continue in the circumferential direction; a character "L" denotes a circumferential groove 22 provided on the same tread pattern as that illustrated in FIG. 8 and formed intermittently in the circumferential direction as illustrated in FIG. 9; and, a character "M" denotes a hole 23 elongated in the circumferential direction as illustrated in FIG. 10 and arranged in the circumferential direction on the same tread pattern as that illustrated in FIG. 8.

TABLE 1

| | Position in tire width direction (mm) | Cross-sectional shape of circumferential groove | Circumferential shape of circumferential groove | Spring constant under normal inner pressure state | Spring constant under zero inner pressure state |
| --- | --- | --- | --- | --- | --- |
| Comparative Example 1 | — | — | — | 100 | 100 |
| Example 1 | 1 | A | K | 96.4 | 100 |
| Example 2 | 1 | A | L | 97.0 | 100 |
| Example 3 | 1 | A | M | 97.6 | 100 |
| Example 4 | 1 | B | K | 98.0 | 100 |
| Example 5 | 3 | A | K | 96.8 | 100 |
| Example 6 | 5 | A | K | 97.2 | 100 |
| Example 7 | 7 | A | K | 97.6 | 100 |
| Example 8 | 14 | A | K | 99.5 | 100 |
| Comparative Example 2 | 15 | A | K | 100 | 100 |

| EXPLANATION OF REFERENCE CHARACTERS | |
| --- | --- |
| 1 | Tread rubber |
| 2 | Bead core |
| 3 | Radial carcass |
| 4 | Belt |
| 4a | Belt end |
| 5 | Reinforcing rubber layer |
| 5a | Inner end of reinforcing rubber layer in tire width direction |
| 10 | Run-flat tire |
| 11 | Tread portion |
| 12 | Bead portion |
| 15 | Road-contacting end under 75% load state |
| 20 | Rigidity reducing portion |
| 20a | Inner end of rigidity reducing portion in tire width direction |
| 21 | Circumferential groove |
| 22 | Divided circumferential groove |
| 23 | Hole elongated in circumferential direction |
| 24 | Reduced-rigidity rubber circumferential band |
| 26, 27, 28 | Inclined groove |

-continued

| EXPLANATION OF REFERENCE CHARACTERS | |
|---|---|
| 29 | Other groove |
| 40 | Intersecting belt layer |
| 41, 42 | Belt ply constituting intersecting belt layer |
| 42a | Ply end of intersecting belt layer on narrower width side |
| 43 | Belt reinforcing layer |

The invention claimed is:

1. A run-flat radial tire including:
a tread portion;
a pair of side wall portions extending internally in the radial direction from both end portions of the tread portion;
a bead portion extending continuously on an interior circumferential side of each of the side wall portions;
a tread rubber provided to the tread portion and forming a road contacting surface;
a radial carcass formed by one or more carcass plies, side portions of which carcass plies are turned-up outwards in the radial direction around a pair of bead cores disposed to each of the bead portions;
a belt formed by one or more belt plies disposed between the radial carcass and the tread rubber; and,
a reinforcing rubber layer having a substantially-crescent-shaped cross section and disposed on the inner side in the tire width direction of the radial carcass at least a portion corresponding to each of the side wall portions,
wherein the tread portion has a rigidity reducing portion that reduces the rigidity of the tire, the rigidity reducing portion being formed in an area located on the inner side than an end of the belt in the tire width direction and on the outer side than a road-contacting end in the tire width direction at a 75% load state where the tire is assembled with a predetermined rim, inflated at a predetermined inner pressure, and subjected to a 75% load relative to a predetermined load, the predetermined load being a maximum load per wheel with an applicable size specified under a predetermined industrial standard, the predetermined inner pressure being a pneumatic pressure corresponding to the maximum load per wheel with the applicable size specified under the predetermined industrial standard, and the predetermined rim being a standard rim with the applicable size specified under the predetermined industrial standard,
wherein the rigidity reducing portion comprises a circumferential groove that opens to a surface of the tread rubber, and
wherein the circumferential groove is formed either continuously or in an intermittent manner so as not to cross an other groove that opens to the surface of the tread rubber,
wherein an inner end of the reinforcing rubber layer in the tire width direction is positioned on the outer side in the tire width direction than the road-contacting end under the 75% load state and on the inner side than the belt end, and
wherein the inner end of the circumferential groove in the tire width direction on the surface of the tread rubber is positioned on the inner side in the tire width direction than the inner end of the reinforcing rubber layer in the tire width direction and on the outer side in the tire width direction than the road-contacting end under the 75% load state.

2. The run-flat tire according to claim 1, wherein
the belt includes an intersecting belt layer formed by attaching two belt plies to each other with their respective cords being inclined at angles opposite to each other with respect to an equatorial plane,
of the belt plies constituting the intersecting belt layer, an end of a narrower-width ply is located on the outer side in the tire width direction than the road-contacting end under the 75% load state, and
the rigidity reducing portion is located on the inner side in the tire width direction than the end of the narrower-width ply.

3. The run-flat tire according to claim 1, wherein
the rigidity reducing portion is formed in a manner that at least part of a recessed portion of the rigidity reducing portion along the tire circumferential direction is provided in an area of the tread portion defined by a tread line of the tread portion passing through the end of the belt and crossed by a plane perpendicular to a surface of the tire, and a road-contacting end line of the tread under the 75% load state, and,
of side walls forming the recessed portion, a side wall located on the outer side in the tire width direction has an obtuse angle with respect to the surface of the tire when the recessed portion is viewed in the cross section in the tire width direction.

4. The run-flat tire according to claim 3, wherein the obtuse angle is 95° or more.

* * * * *